US007249681B2

(12) United States Patent
Scicluna et al.

(10) Patent No.: US 7,249,681 B2
(45) Date of Patent: Jul. 31, 2007

(54) MEDIA SHELVING

(75) Inventors: Raymond Scicluna, Robina (AU); Joseph Victor Scicluna, Robina (AU)

(73) Assignee: Trade Guys International Pty Ltd., Queensland (AU)

( * ) Notice: Subject to any disclaimer, the term of this patent is extended or adjusted under 35 U.S.C. 154(b) by 0 days.

(21) Appl. No.: 11/056,307

(22) Filed: Feb. 11, 2005

(65) Prior Publication Data

US 2005/0178735 A1 Aug. 18, 2005

(51) Int. Cl.
*A47G 29/00* (2006.01)

(52) U.S. Cl. .................. 211/40; 211/41.12; 206/307; 312/9.1

(58) Field of Classification Search ............... 211/40, 211/41.12; D6/407, 626; 206/307; 312/9.1
See application file for complete search history.

(56) References Cited

U.S. PATENT DOCUMENTS

| 3,160,282 | A | * | 12/1964 | Gunn ..................... 211/184 |
| 3,737,046 | A | | 6/1973 | Jeter |
| D275,536 | S | * | 9/1984 | Sandy ..................... D6/473 |
| 4,573,588 | A | | 3/1986 | Cohen |
| 4,684,030 | A | | 8/1987 | Gurzynski |
| 4,811,851 | A | | 3/1989 | Shane |
| 4,815,611 | A | | 3/1989 | Gurzynski et al. |
| 4,892,198 | A | * | 1/1990 | Johnson ..................... 211/40 |
| 4,971,206 | A | | 11/1990 | Lemmerman et al. |
| 5,031,780 | A | * | 7/1991 | Lemmerman et al. ... 211/41.12 |
| D334,311 | S | * | 3/1993 | Sandy ..................... D6/467 |
| D342,398 | S | * | 12/1993 | Lemmerman et al. ....... D6/467 |
| 5,289,925 | A | | 3/1994 | Newmark |
| 5,370,243 | A | | 12/1994 | Rosario |
| 5,474,190 | A | | 12/1995 | Won-Kim |
| D388,266 | S | * | 12/1997 | Axelrod ..................... D6/468 |
| D411,070 | S | * | 6/1999 | Jongwatana ................. D6/630 |
| D473,076 | S | * | 4/2003 | Johnson ..................... D6/475 |
| D474,923 | S | * | 5/2003 | Johnson ..................... D6/475 |
| 6,959,821 | B2 | * | 11/2005 | Huang ..................... 211/13.1 |
| 2003/0192837 | A1 | | 10/2003 | Hunt |

FOREIGN PATENT DOCUMENTS

| GB | 2 310 790 A | 10/1997 |
| GB | 2 378 121 A | 5/2003 |

* cited by examiner

*Primary Examiner*—Richard E. Chilcot, Jr.
*Assistant Examiner*—Lindsay M. Maguire
(74) *Attorney, Agent, or Firm*—Parsons & Goltry; Robert A. Parsons; Michael W. Goltry

(57) ABSTRACT

A media shelving unit comprising a base for supporting a media storage case; a plurality of dividers extending upwardly from the base, the plurality of dividers defining at least two channels; wherein the channels are at different orientations with respect to each other.

8 Claims, 7 Drawing Sheets

MEDIA SHELVING

CROSS-REFERENCE TO RELATED APPLICATION

This application claims the benefit of Australian Provisional Application No. 2004900703, filed 13 Feb. 2004.

FIELD OF THE INVENTION

This invention relates to media shelving. In particular, the invention relates to the display of media storage cases such as video cases, DVD cases, and CD cases, and therefore will be described in this context. However, it should be appreciated that the media shelving may be used to display other elements such as books.

BACKGROUND OF THE INVENTION

DVDs are currently the most popular source of media used to watch movies. A DVD is usually kept within an associated media storage case that shows a representation of the movie that is located on the DVD. People can therefore easily identify what movie is located on the DVD without the need to play the DVD.

Most retail outlets display DVD cases on shelving so that people are able to easily recognise the DVD they wish to purchase or hire. The DVD cases are often placed on a flat shelf adjacent to each other. The shelving allows different orientations of the DVD cases to be chosen by a person so as to highlight a particular DVD case for purchase or hire purposes.

However, if the DVD cases are not carefully placed on the shelving, an adjacent case can block a person's view of the DVD case that a person is searching for to purchase or hire. Further, a cluster of DVD cases can often become aesthetically unappealing as they may be located in different orientations and spacing on the shelving. Still further, the DVD cases may be easily knocked over as the width of the DVD cases is relatively small compared to their height and therefore when they are placed on flat shelving they are unstable.

U.S. Pat. No. 4,573,588 attempts to solve these problems by providing shelving that has a series of spaced dividers that extend upward and at regular spaced intervals along the length of the shelving. Cases are located between two respective dividers to hold the cases in a desired location. Hence, the cases are spaced in an orderly fashion without adjacent cases impeding a person's view of any other cases. Further, the cases cannot be easily knocked over as they are held in position by the spacers.

The shelving described in U.S. Pat. No. 4,573,588 is very effective in providing specified spacing and holding. However, it does not allow for different orientations of the cases as allowed by traditional shelving.

OBJECT OF THE INVENTION

It is an object of the invention to overcome or alleviate one or more of the above disadvantages or provide the consumer with a useful or commercial choice.

SUMMARY OF THE INVENTION

In one form, although not necessarily the only or broadest form, the invention resides in a media shelving unit comprising:

a base;

a plurality of dividers extending upwardly from the base, the plurality of dividers defining at least one channel; and a lip extending outwardly from the base.

In another form, the invention resides in a media shelving unit comprising:

a base for supporting a media storage case;

a plurality of dividers extending upwardly from the base, the plurality of dividers defining at least two channels;

wherein the channels are at different orientations with respect to each other.

BRIEF DESCRIPTION OF THE DRAWINGS

Embodiments of the invention, by way of examples only, will be described with reference to the accompanying drawings in which.

DETAILED DESCRIPTION OF A PREFERRED EMBODIMENT

Figure 1:
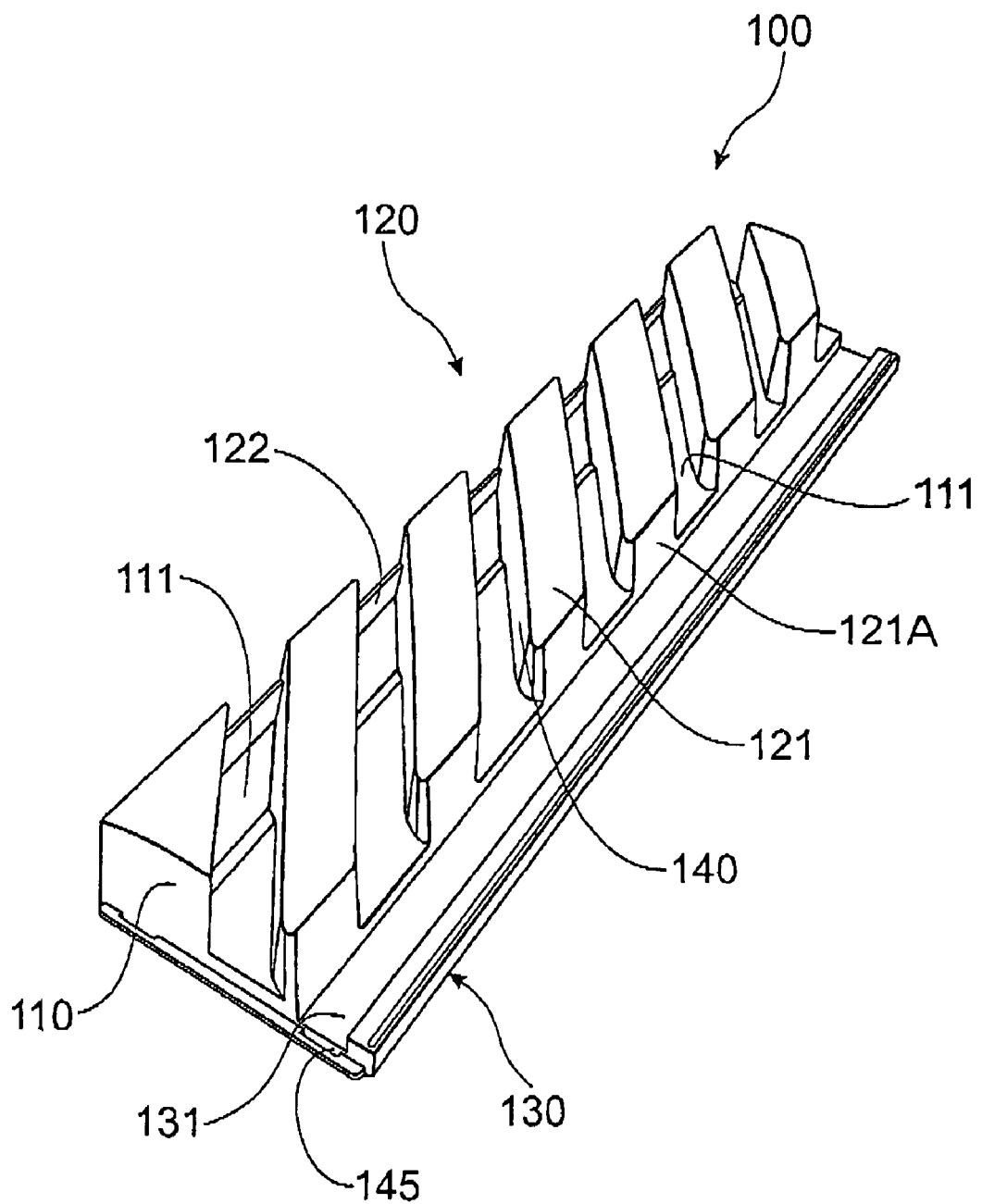
FIG. 1 is a perspective view of a media shelving unit according to a first embodiment of the invention.

FIG. 1 shows a perspective view of a media shelving unit 100 used to form media shelving. The media shelving unit 100 is integrally formed and constructed of injected moulded plastics.

The media shelving unit 100 includes a base 110, a projection 120 and a lip 130. The base 110 is substantially planar and is normally affixed using adhesive However, it should be appreciated that the media shelving may contain holes for location of fasteners for fixing.

The projection 120 extends upwardly from the base 110. The projection 120 includes a plurality of dividers 121 and a rear wall 122. The dividers 121 are connected to the rear wall 122 and extend outwardly from the rear wall 122 at an angle of approximately 60 degrees. It should be appreciated that this angle may be varied. The dividers 121 are substantially parallel to each other. A front face 121A of each of the dividers 121 is substantially flat and all the front faces 121A of all of the dividers 121 lie in the same plane.

A channel 140 is formed between a pair of the adjacent dividers 121. The channel 140 is of a sufficient width to hold a DVD case. However, it is envisaged that the width of the channel may be varied to hold other media storage cases.

The lip 130 extends outwardly from the base 110 and is located adjacent the front face 121A of each of the dividers 121. The lip 130 includes a recess 131 that extends the length of the lip 130. The recess is of a sufficient width to hold a media storage case.

Two or more shelving units may be located next to each other to form media shelving 101. Attachment members 14 are located at each side of the media shelving unit to join adjacent shelving units.

Figure 2A:
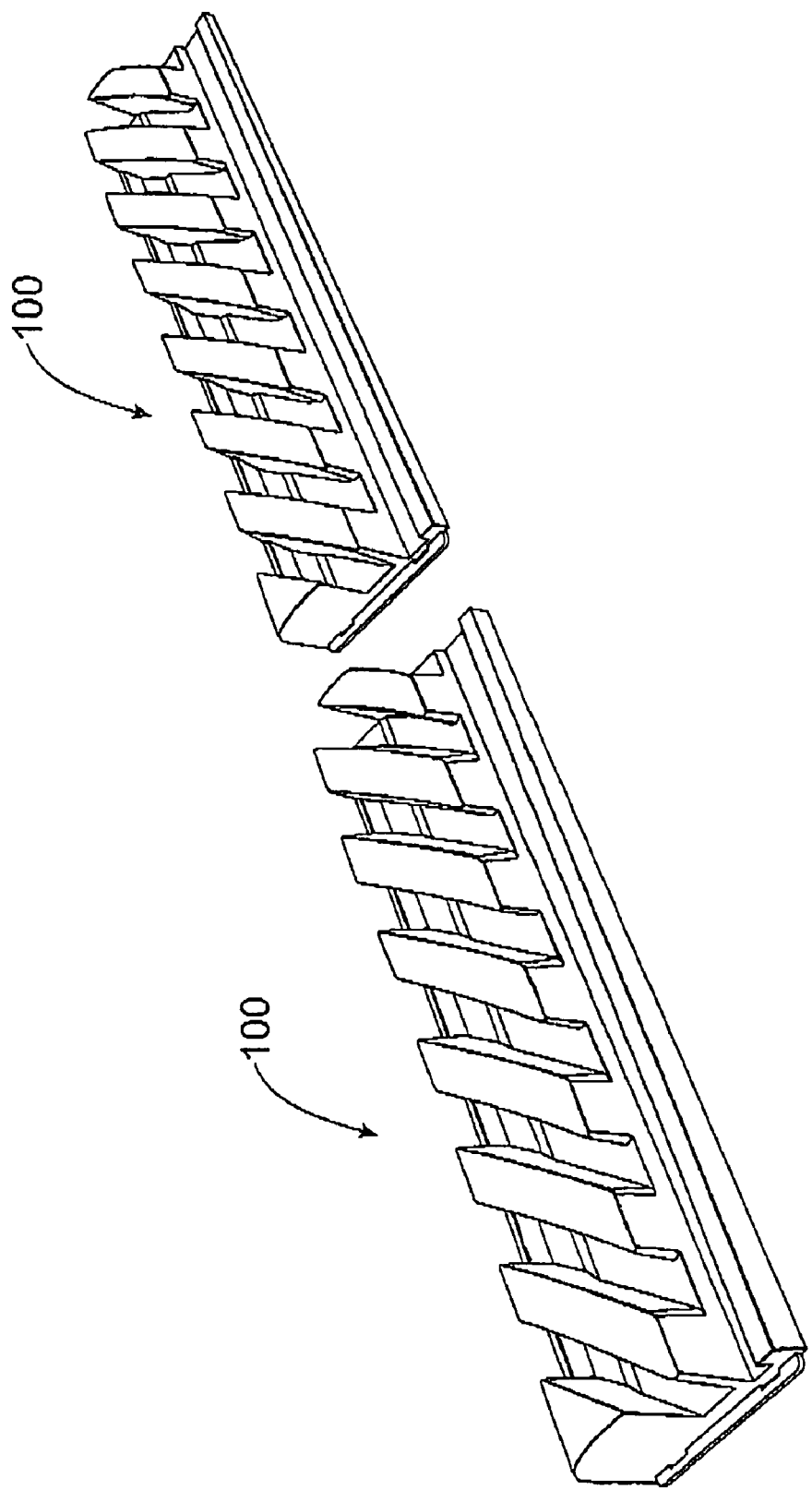
FIG. 2A is a perspective view of two adjacent media shelving units shown in FIG. 1.
Figure 2B:
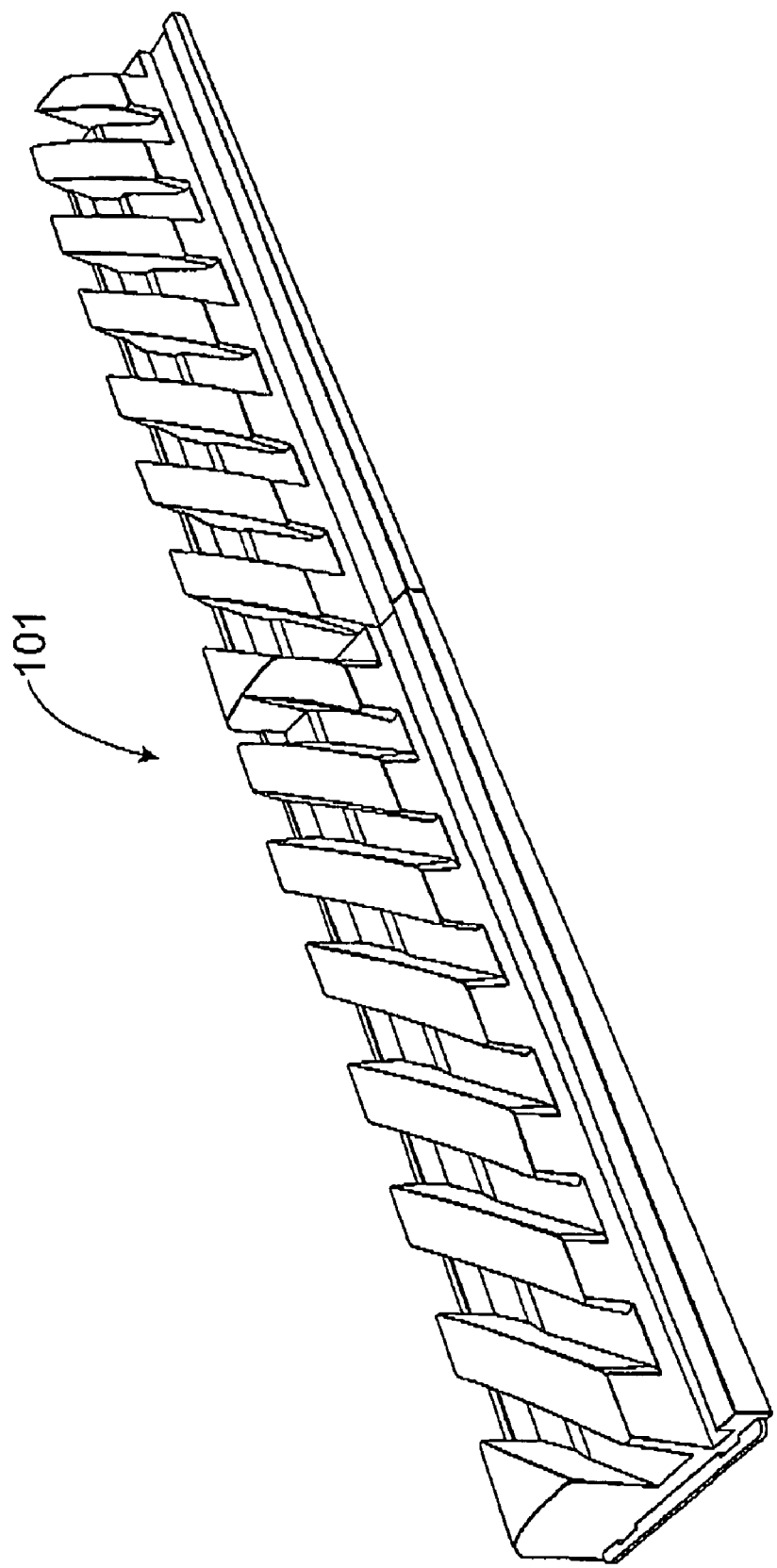
FIG. 2B is a perspective view of two joined media shelving units shown in FIG. 1.

FIG. 2A shows two media shelving units 100 adjacent each other prior to the media shelving 101 being formed as shown in FIG. 2B.

Figure 3A:
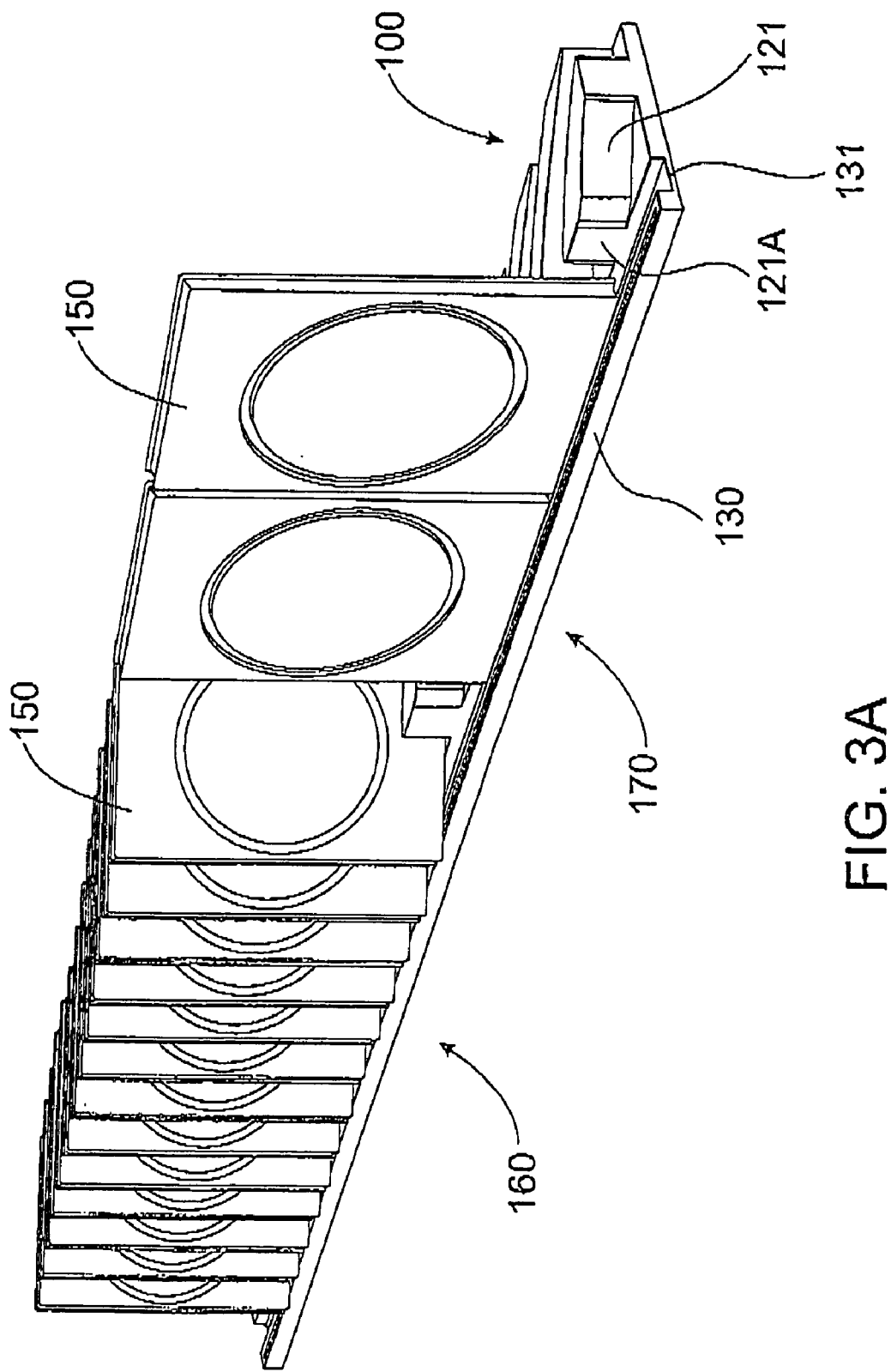
FIG. 3A is a perspective view of a media shelving unit of FIG. 1 having media storage cases located within the shelving.
Figure 3B:
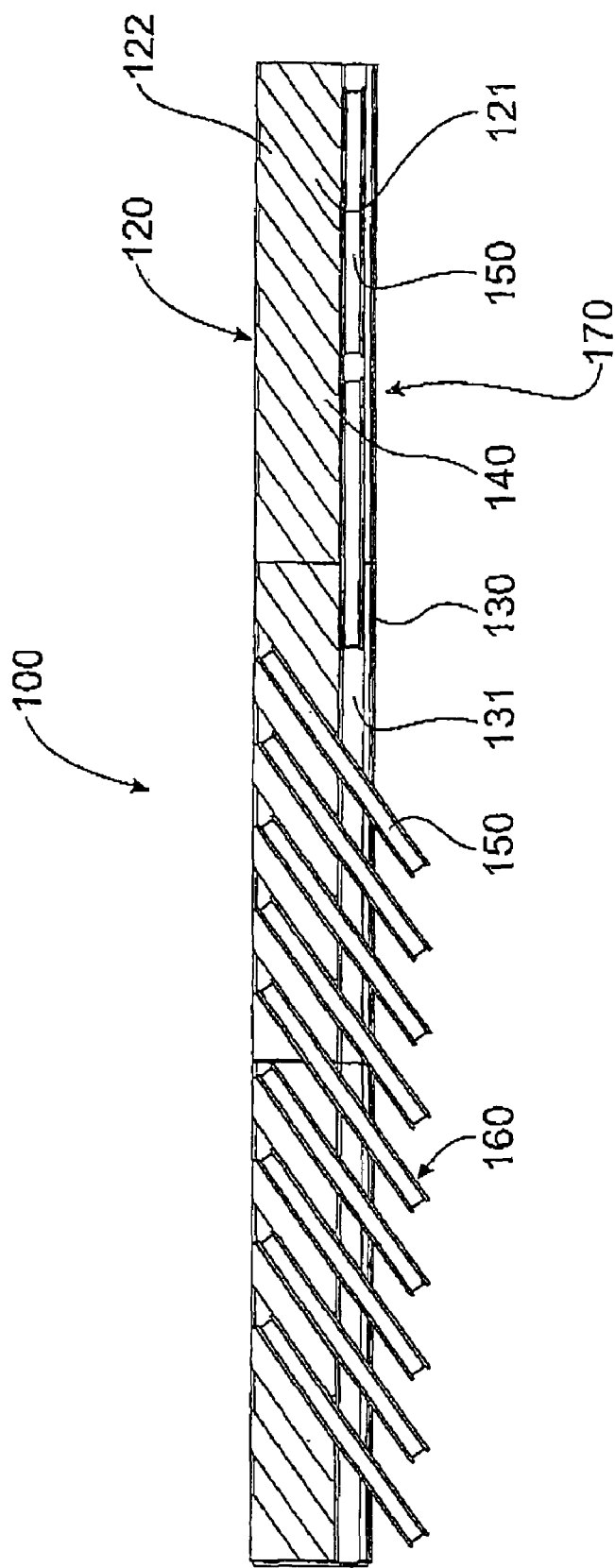
FIG. 3B is top view of a media shelving unit of FIG. 1 having media storage cases located within the shelving.

FIGS. 3A and 3B show the media shelving in use with DVD cases 150. The DVD cases 150 may be displayed in two different orientations 160 and 170. The first orientation 160 occurs when a DVD case 150 is placed within a channel 140. The DVD 150 case is held in position by the dividers 121.

The second orientation 170 occurs when a DVD case 150 is placed within the recess 131 of the lip 130. The DVD case 150 is held in position by the recess 131 and the front face 121A of each of the dividers 121.

The media shelving unit 100 allows DVD cases 150 to be displaced in two different orientations depending on the desired needs. The first orientation 160 allows substantially more media storage cases to be held and displayed by the shelf when compared to the second orientation 170. However, the second orientation 170 allows the DVD cases to be held so that a full view of a display face of the DVD case is exhibited.

Figure 4:
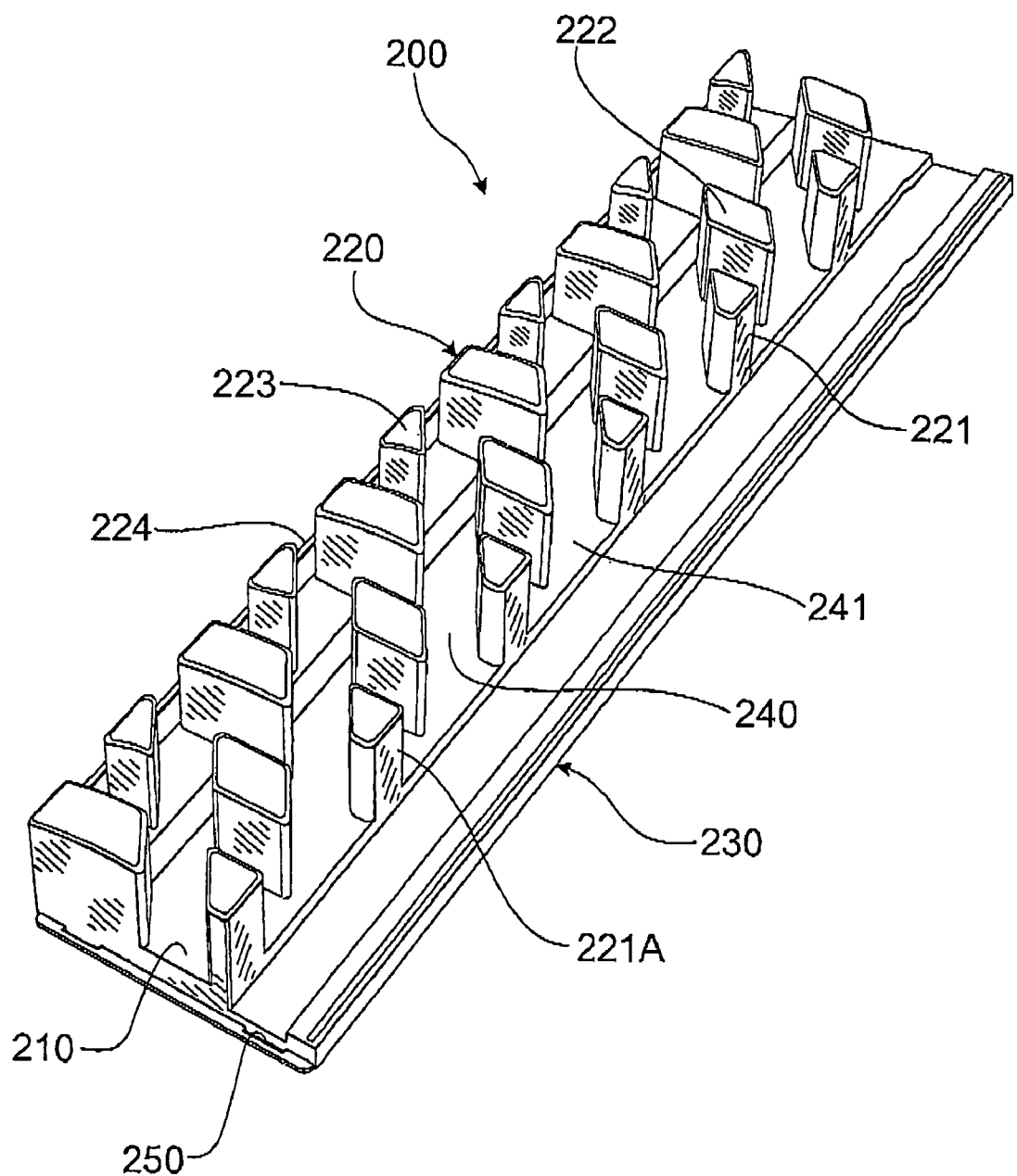
FIG. 4 is a perspective view of a media shelving unit according to a second embodiment of the invention.

FIG. 4 shows a second embodiment of a media shelving unit 200. The media storage unit again has a base 210, a series of projections 220 and a lip 230. The series of projections include front dividers 221, intermediate dividers 222, rear dividers 223 and a rear wall 224 that all extend upwardly from the base 210.

The front dividers 221 are located adjacent the lip 230. A front face 221A of each of the front dividers 221 is substantially flat and all of the front faces 221A of all of the front dividers 221 lie in the same plane. The rear dividers 223 are connected to the rear wall 224.

A series of first channels 240 and a series of second channels 241 are formed from the front dividers, intermediate dividers and rear dividers. The series of first channels 241 extend outwardly from the rear wall 224 at an angle of approximately 30 degrees whilst the series of second channels 241 extend outwardly from the rear wall 224 at an angle of approximately 90 degrees. Each of the first channels and the second channels are of a sufficient width to hold a DVD case 250. However, it is envisaged that the width of the channel may be varied to hold other media storage cases.

Figure 5:
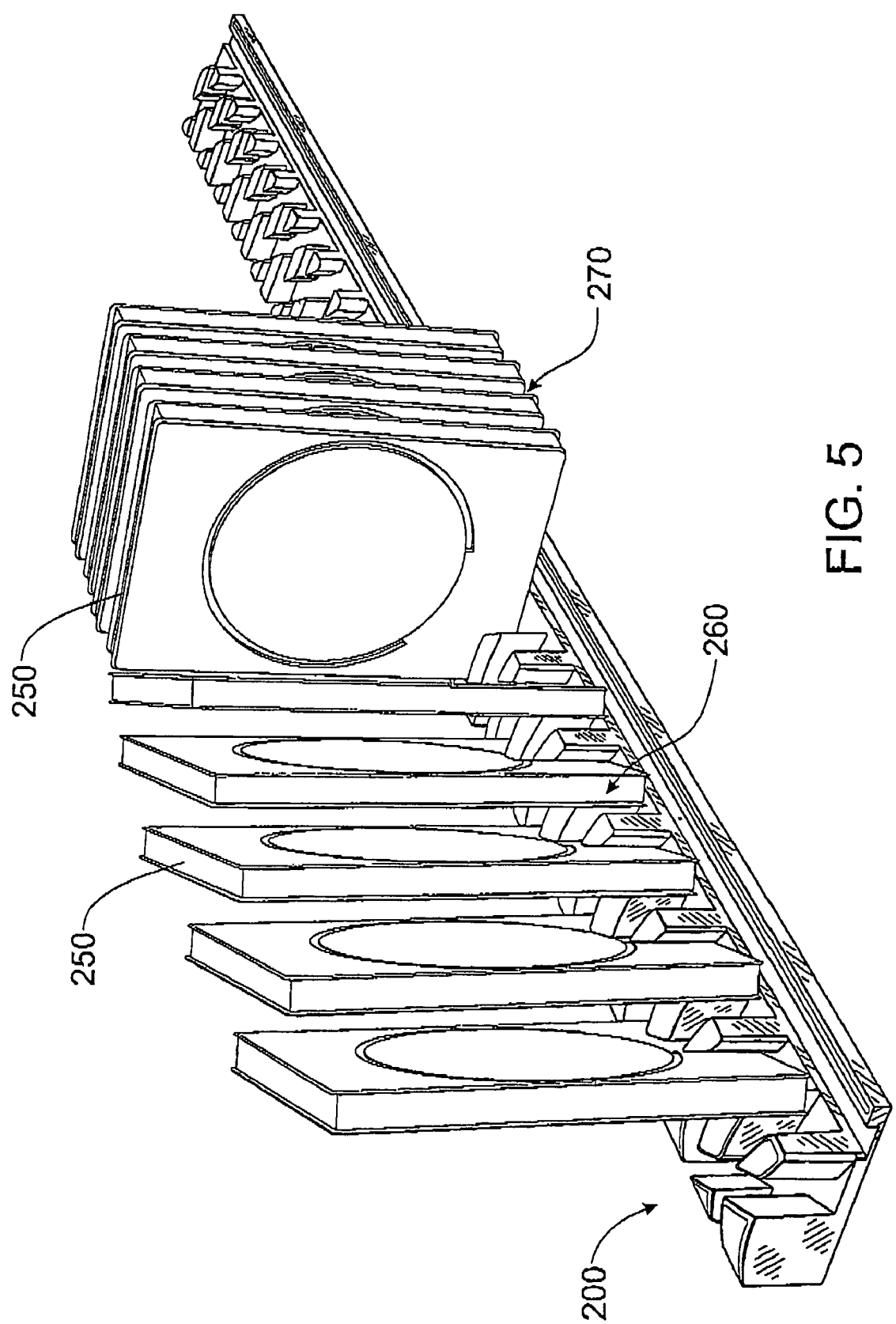
FIG. 5 is a perspective view of a media shelving unit of FIG. 4 having media storage cases located within the shelving.

FIG. 5 shows the media storage units used to form media shelving. Attachment members 250 are located in the sides of the media shelving unit. DVD cases are located on the media shelving in three different orientations. The first orientation 260 occurs when a DVD case 250 is located within a first channel 240 so that the DVD case 250 is angled at approximately 30 degrees with respect to the rear wall 224.

The second orientation 270 occurs when the DVD case 250 is located within a second channel 241 so that the DVD case 250 is approximately perpendicular to the rear wall 224. When a DVD case 150 is located within either the first channel 240 or the second channel 241, the dividers hold the DVD case 250 in position.

The third orientation (not shown) occurs when a DVD case is placed within the recess of the lip. This orientation is the same as the orientation 270 shown in FIGS. 3A and 3B. The DVD case 250 is held by a recess 231 located within the lip 230 and the front face 221A of each of the front dividers 221.

In this embodiment, the DVD cases may be located in three different orientations depending on desired needs. The first orientation allows a partial view of a display face of the media storage cases, the second orientation only allows a spine of the media storage case to be displayed whilst the third orientation allows the media storage case to be held so that a full view of a display face of the DVD case is exhibited.

It should be appreciated that various other changes and modifications may be made to the embodiments described without departing from the spirit or scope of the invention.

The invention claimed is:

1. A media shelving unit comprising:
    a base for supporting a media storage case;
    a rear wall extends upwardly from the base;
    a plurality of dividers extending upwardly from the base, the plurality of dividers defining at least a first series of channels and a second series of channels;
    wherein the first series of channels extends from the rear wall at a first angle and the second series of channels extend from the rear wall at a second angle.

2. The media shelving unit of claim 1 wherein each divider in the plurality of dividers partially defines a channel forming part of the first series of channels and a channel forming part of the second series of channels.

3. The media shelving unit of claim 1 further comprising a lip, the lip extending outwardly from an end of the base.

4. The media shelving unit of claim 1 wherein further comprising a lip extending outwardly from an end of the base, the lip includes a recess that extends at least partially along the length of the lip.

5. The media shelving unit of claim 1 wherein the first angle and the second angle are orientated at least 30 degrees from each other.

6. The media shelving unit of claim 1 wherein at least one attachment member is formed on at least one side of the media shelving unit.

7. A media shelving unit comprising:
    a base for supporting a media storage case;
    a rear wall extends upwardly from the base;
    a plurality of dividers extending upwardly from the base, the plurality of dividers defining at least a first series of channels and a second series of channels;
    the plurality of dividers include one or more front dividers, one or more intermediate dividers and one or more rear dividers; and
    wherein the first series of channels extend from the rear wall at a first angle and the second series of channels extend from the rear wall at a second angle.

8. The media shelving unit of claim 7 wherein a front face of at least one of the dividers is flat.

* * * * *